Feb. 28, 1967  A. A. ABRAHAMSEN ET AL  3,305,962
APPARATUS FOR DIRECTING MARINE ANIMALS
Original Filed May 14, 1963  2 Sheets-Sheet 1

INVENTORS.
Albert A. Abrahamsen
Richard W. Simmons
BY

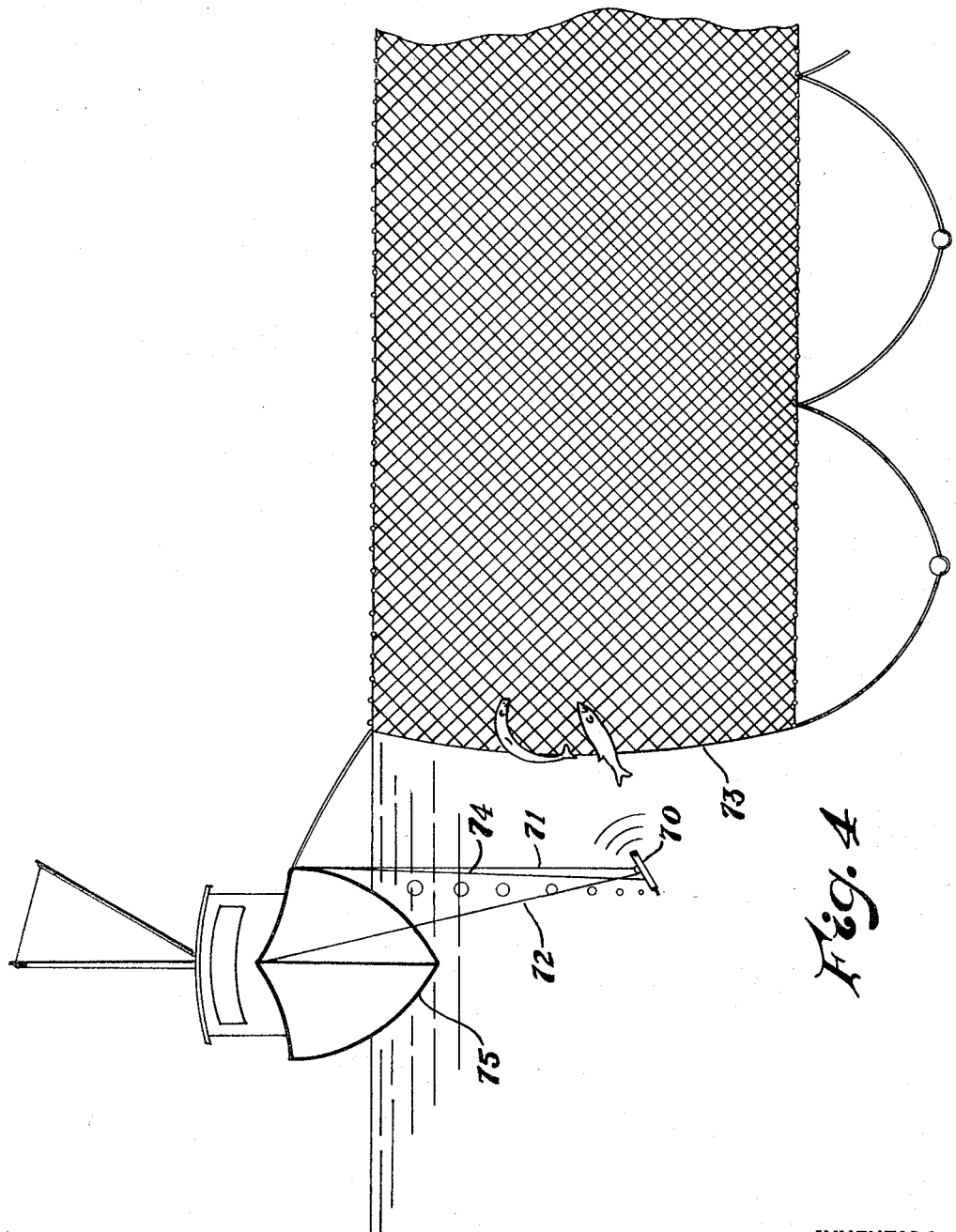

United States Patent Office 3,305,962
Patented Feb. 28, 1967

3,305,962
APPARATUS FOR DIRECTING MARINE ANIMALS
Albert A. Abrahamsen, 1399 Fort Bellingham Road, and Richard W. Simmons, 109 E. Illinois St., both of Bellingham, Wash. 98225
Original application May 14, 1963, Ser. No. 280,326, now Patent No. 3,229,404, dated Jan. 18, 1966. Divided and this application Sept. 2, 1965, Ser. No. 495,745
8 Claims. (Cl. 43—17.1)

This invention relates to an apparatus for directing marine animals and is a division of application Serial No. 280,326, filed May 14, 1963, now Patent No. 3,229,404.

In various methods used to capture marine animals by entrapment, especially the fast-swimming animals, such as fish, a substantial quantity of the animals escape entrapment or capture by swimming around the sides or avoiding the entrapment. For example, in fishing with nets for fish, such as salmon and tuna, the fish, upon seeing the net, will swim under or around the side of the net before the net can be closed or pursed and thus avoid capture. To reduce the loss around the sides of the net, fishermen commonly agitate the water near the edge of the net with long-handled poles. By vigorously splashing and plunging, they are able to frighten some of the fish back towards the center of the net and thus reduce the number escaping. Little, however, can be done to prevent the fish from escaping under the net. Moreover, by "plunging," which necessarily agitates the surface, frequently this action drives the fish down. Often entire schools of tuna will sound and swim under the net to escape capture.

It is therefore an object of this invention to provide a device for directing marine animals in water. It is a further object to provide a device for directing marine animals in water to prevent them from escaping or avoiding entrapment. A still further object is to provide a device to create sub-surface disturbance in the water to direct the fish in the water. A still further object is to provide a device to direct the fish into the entrapping enclosure.

The above and other objects are obtained according to the invention by immersing at a predetermined depth a visible object in the water periodically striking the object with another object to impart an underwater sound wave due to the mechanical impact, and discharging in the area of the sound wave a gas intermittently to thereby obtain an intermittent multiplicity of rising gas bubbles. By combining a mechanical impact with an intermittent discharge of gas bubbles, the fish are directed away from the gas bubbles and thus are prevented from escaping the entrapment.

In directing marine animals to keep them from moving in a particular direction or area, it is necessary to create a disturbance under water using a visible object from which intermittent sharp sound waves are generated which are audible in the water for a considerable distance. In addition to the audible sound waves, it is necessary to intermittently discharge a gas in the area of the sound wave to obtain an intermittent rising multiplicity of gas bubbles. It is necessary that the sound wave and the gas release be intermittent preferably with variable intervals between the sound and discharge cycles, for under conditions where a steady or uniform stream of gas bubbles or sound waves are encountered, the fish or marine animals soon become accustomed to the disturbance, and the disturbance is no longer effective. In addition to the intermittent disturbance, movement of the visible object in an erratic motion greatly enhances the effectiveness.

A convenient way of obtaining an erratic motion and to generate a sharp sound wave in the water is to impact two objects under water by a device such as shown in the attached drawings, in which:

FIGURE 4 shows the device being used in a fishing operation.

Figure 1:
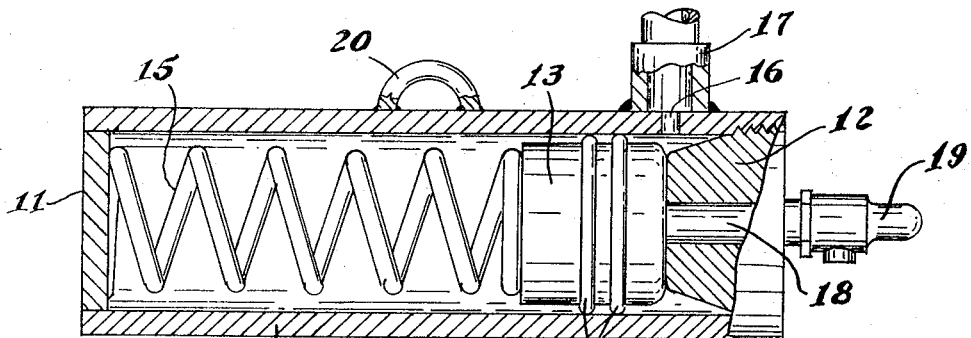
FIGURE 1 is a cut-away of a device which may be used for directing fish according to this invention.

The device as shown in FIGURE 1 comprises a shell or cylinder 10 having closed ends 11 and 12. A movable piston 13 having seal rings 14 is positioned in the cylinder by a resilient body 15 which as shown is a coil spring. The shell has an inlet passageway 16 through which a fluid may be introduced by means of a line or hose attached to the shell in communication with the passageway. As shown, a receptacle 17 is provided as the means of attachment of a hose or line. The receptacle may be threaded or other means such as quick-disconnect coupling or other various known means may be used.

End 12 of the cylinder has a passageway 18 communicating with the inside of the cylinder. In passageway 18, a pressure release valve 19 is inserted. Also, the cylinder has a handle-like appendage 20 attached to the cylinder which provides a means for suspending the device in the water by a cable, although the hose or fluid line may also be used to suspend the device.

Figure 2:
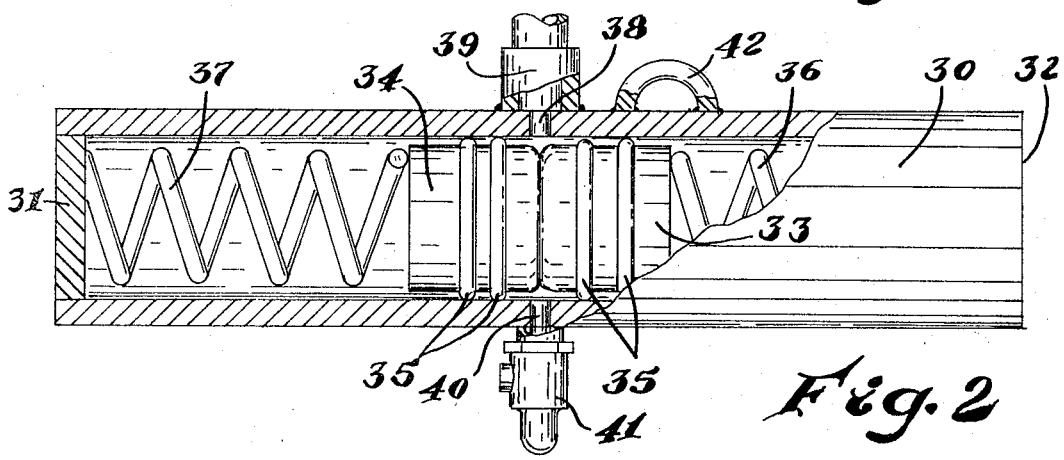
FIGURES 2 and 3 are likewise cross-sectional views of particular modifications of the apparatus shown in FIGURE 1.

FIGURE 2 is similar to FIGURE 1 except that a piston and a spring are located at each end of the cylinder with the inlet passage 38 and discharge passage 40 containing relief valve 41 being located near the center of the cylinder at the point where the two pistons meet.

Figure 3:
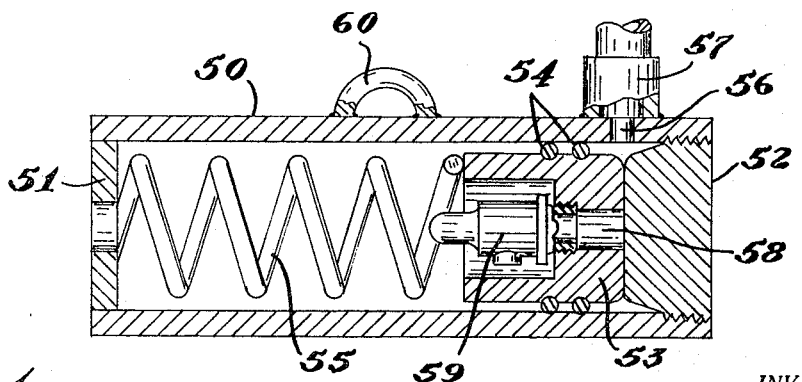

FIGURE 3 is a further variation of FIGURE 1 wherein end 51 of the cylinder is an annulus. The piston in the cylinder has a passageway 58 through the center running along the longitudinal axis of the piston in which a release valve 59 is placed.

In operation of the apparatus shown in FIGURE 1, a fluid such as air is injected into cylinder 10 through inlet 16 moving piston 13 against spring 15 compressing the spring. The injection of the fluid is continued until the pressure in the cylinder is sufficient to compress the spring and operate the pressure relief valve 19. Upon opening of the relief valve, the gas is explosively discharged in the water and the spring propels pistons 15 to impact upon end 12 of the cylinder with sufficient force to produce an audible sharp impact to generate a sound wave in the water which can be distinctly heard for a distance of at least about 50 feet in the water.

In FIGURE 2, the apparatus functions similarly as that in FIGURE 1 except that, by the injection of the gas, both pistons 33 and 34 are moved apart compressing the respective springs until a predetermined pressure is reached at which time the relief valve 41 will release the pressure, permitting both of the pistons to be propelled by the respective springs to impact both of the pistons against each other within the cylinder.

In the operation of the device shown in FIGURE 3, the operation is similar to that described above except that the relief valve is placed in the passageway in the piston so that the release of the gas will discharge through the annular end upon which the spring bears.

FIGURE 4 shows the use of a device as shown in the FIGURES 1, 2, or 3 used in fishing. As shown in FIGURE 4, device 70 is lowered in the water on lines 71 and 72 to a predetermined depth between the end of the net 73 and the boat 75. A gas line 74 is attached from the boat to the device so that compressed air may be injected into the device. Air or a gas such as carbon dioxide is injected into the cylinder, pushing back the piston to compress the spring until a predetermined pressure is reached at which the relief valve opens. Upon the opening of the relief valve, the piston will impact against the end of the cylinder, creating an audible, sharp, mechanical sound wave by the impact and at the same time discharge explosively the air or non-soluble gas from the cylinder through the relief valve to produce an intermittent eruption of gas in the water. Generally, the high pressure gas is an amount of at least two cubic inches which, upon expansion to a pressure close to atmospheric pressure, will greatly increase the volume. Although the amount of gas injected or discharged may be much greater, seldom more than 20 cubic inches of gas is used per cycle. The inertia of the piston striking the end of the cylinder and the gas discharge causes the device to jump and dart around in an erratic motion within the water. The impact produces a sharp metallic sound wave which is clearly audible in the water, and the intermittent rising air bubbles produce a visible barrier to the passage of the marine animals such as fish to prevent them from going around the end of the net. Since the device is generally positioned at a predetermined depth below that which the fish will be normally encountered, the disturbance of the sound wave and air bubbles will prevent the fish from sounding but rather drive the fish towards the surface of the water and back toward the center of the net or the entrapment.

If desirable, a timing device may be used so that the air or gas is injected into the cylinder periodically to obtain intermittent or cyclic action at a changing frequency. However, it is not necessary to use a timing device. For example, passage 16 can be made small enough so that air, under pressure, for example, from 50 to 250 pounds per square inch may be turned on and left on continually. The amount of air passing into the cylinder is thus restricted so that it will require from about one or two seconds to about 20 or 30 seconds to fill the cylinder, compressing the spring and building up the pressure within the cylinder to a point where the relief valve will discharge. A periodic variation of the gas pressure results in changing the cycle time. However, even with substantially a constant pressure, there is sufficient variation of opening and closing of the release valve to obtain a changing cycle time. The relief valve is of sufficient size so that upon its opening, the pressure from the cylinder is quickly discharged so that the spring can drive the piston up against the cylinder. Then, after the pressure is released, the relief valve will seat and the air entering through inlet 16 at a restricted rate will again begin to compress the spring and build up in the cylinder. The frequency of the cycle used varies with the species of marine animals on which the device is used. For salmon and other fast-swimming animals, a frequency of from two to five seconds per cycle is generally used.

In fishing for tuna or other fish which are down at considerable depth, it may be desirable to use more than one or several devices located at each end of the net and also to attach devices to the lead line at the bottom of the net so that the tuna would not sound to avoid the net. The units or devices which are placed on the lead line of the net are generally supplied with very small inlet passageways so that they operate at a frequency of about 10 to 15 seconds per cycle. Thus, they keep the fish from passing under the net without dispersing the school.

It is not necessary to limit the use of this device to any particular type of netting. It may be used for purse seine fishing, beach seining or reef-netting. Also, this device may be used not only in netting but for directing fish into a particular channel or course. A number of these devices may be thus immersed in the water at a given depth in a particular line or a group to form a channel through which the fish will pass.

For example, this device may be used to direct the migrating path of fingerling salmon so as to insure the free-escapement of these smolts from the hazards attendent to turbines and irrigation diversions which they might encounter during their downstream migration. For example, several of these devices operating in front of the penstock intakes of a hydroelectric generator would preclude the entry of such smolt into the turbines. Normally, more than one-half of the small fish passing such an intake are killed. Thus, the device may be used in fish conservation as well as in fishing.

A further application of this device in fishing which relates to the direction of marine animals other than fish is its use in repelling predacious marine mammals. For example, severe losses of salable halibut are suffered by fishermen when sea lions or seals attack the hooked fish as they are being raised to the surface. This "longline" method of fishing provides a series of hooks attached to a heavy line which is stretched along the bottom of the ocean. Such fishing occurs at depths below the range of predacious marine mammals. When, however, the line is lifted, extensive damage to the hooked fish results from the attacks of seals and the like. Suspending the device of this invention over the stern of the vessel and operating it during the lift of the gear frightens the predators from the area.

The device as described used air or a gas as a means for actuating the piston to thereby obtain the mechanical impact, and the discharge of the gas from the cylinder supplied the intermittent discharge of gas bubbles. However, it is not necessary to use air or a gas as an actuating medium to obtain the impact or the audible sound wave. The device may be operated hydraulically and the fluid, instead of being discharged into the water, is returned to the tank or reservoir. A time or pressure operated solenoid valve may be used to regulate the cycle. Such a device would only result in creating the sound wave. The discharge of a gas within the vicinity of the device is accomplished by the immersion of an air or gas line next to the device and having the gas intermittently discharged near the device. Also, it may be possible to use a hydraulic means for depressing the piston to obtain the impact and using the movement of the piston to actuate a second piston in another cylinder to draw the air into the second cylinder upon the compressor stroke and discharge the air on the impact stroke. However, a device where air or an insoluble gas is used as the motivating force is more convenient, since it can also be used to provide the required gas bubbles.

It is apparent that the device as described above may be modified further in many respects, without departing from the invention. In addition to employing a pressure relief valve set to relieve at a predetermined pressure, or a time pressure operated solenoid valve, a sliding valve mechanism actuated by a rod attached to the base of the piston and extending through the base of the cylinder may be used to release the air from the cylinder at the point of maximum backstroke. Also, it is not necessary to use a spring to act against the piston. Any resilient body may be used such as an elastic body as rubber or a compressed air chamber enclosed in an elastic container supported by a rubber or elastic diaphragm acting on the piston. Likewise, it is not necessary to use a fluid pressure and a resilient body as a means of imparting an impact to generate a sound wave. The piston can also be a solenoid core, encompassed by an electrical coil, whereby the passing of an electric current intermittently through the coil can be made to impact the piston upon a portion of the coil supporting structure.

The device may be constructed of metal or plastic such that the impact created by the cylinder or the piston would give a metallic sound. The device may be painted yellow, for example, or some other color to give the maximum visibility. Generally, the device may be constructed of corrosion resistant material. If it is to be used in salt water, a corrosion resistant material such as stainless steel or bronze may be used.

The terms "sound waves" as used herein means disturbance created within the water to generate sound waves within the water.

Likewise, it is apparent that the term "marine animals," as used herein, includes animals found in fresh water in lakes and streams as well as in salt water.

What is claimed is:

1. A device for directing marine animals, which comprises an enclosed shell, means to suspend said shell in water at a predetermined depth, a resilient body within said shell, a movable piston in said shell positioned at one end of said shell in abutting relation to said resilient body, means to inject into said shell a fluid at a predetermined pressure suitable to move the piston against the bias of the resilient body, means to intermittently discharge the fluid from said shell at a predetermined pressure to thereby permit the resilient body to drive the piston with sufficient force to generate sound waves in the water upon impact of the piston with said one end of said shell.

2. A device according to claim 1 wherein the fluid is a gas.

3. A device for directing fish in water, which comprises an enclosed cylinder, means to suspend said cylinder in water at a predetermined depth, a compression spring within said cylinder, a movable piston positioned in said cylinder at a predetermined point with one end thereof abutting said spring, means for injecting a fluid into said cylinder under a pressure suitable to move the piston to be propelled by the spring to impact upon spring, and means to discharge said fluid from the cylinder intermittently at a predetermined pressure permitting the piston to be propelled by the spring to impact upon a portion of said cylinder with sufficient force to generate sound waves in the water.

4. A device for directing fish in water, which comprises a cylinder closed at both ends, a means to suspend said cylinder at a predetermined depth of water, a compression spring positioned in said cylinder at one end, a movable piston positioned in said cylinder at a predetermined point with one end abutting said spring, means for injecting a fluid into said cylinder under a pressure suitable to move the piston against the bias of the spring compressing the spring, and means to discharge said fluid from the cylinder intermittently at a predetermined pressure permitting the piston to be propelled by the spring to impact upon a portion of said cylinder with sufficient force to generate sound waves in the water.

5. A device for directing fish in water, which comprises a cylinder closed at both ends, a means to suspend said cylinder in the water at a predetermined depth, a movable piston positioned in said cylinder, a compression spring positioned in said cylinder between one end of the piston and one end of the cylinder, said piston having its end which is distant from the end closest to said spring in contact with the other end of said cylinder, means to inject a gas into said cylinder against the end of the piston distant from the end closest to the spring under suitable pressure to move the piston against the bias of the spring compressing the spring, a release valve set to open at a predetermined pressure to discharge the gas from the cylinder into the water and permitting the piston to be propelled by the spring to strike the other end of said cylinder to generate sound waves in the water.

6. A device for directing fish in water, which comprises a cylinder closed at both ends, means for suspending said cylinder in the water at a predetermined depth, said cylinder having an inlet passageway and an outlet passageway through its wall, a compression spring positioned in said cylinder, a movable piston positioned in said cylinder with one end abutting said spring at a predetermined point free of the inlet and outlet passageways in the cylinder wall with the end of the piston distant from the spring being in contact with a portion of said cylinder and less distant from said passageways, a gas line connected to said inlet passageway for injecting a gas into the cylinder at super-atmospheric pressure sufficient to move the piston against the bias of the spring compressing the spring, a release valve set to open at a predetermined pressure attached to the outlet passageway of said cylinder to thereby discharge the gas from the cylinder into the water permitting the spring to propel the piston to impact upon said portion of the cylinder to generate sound waves.

7. A device for directing fish in water, which comprises a cylinder closed at both ends, said cylinder having an inlet and outlet passageway through its wall at one end portion, a compression spring positioned in said cylinder at the end portion of the cylinder distant from the inlet and outlet passageways, a movable piston positioned against the spring in said cylinder free of the inlet passageway in the cylinder with the end of the piston distant from the spring being in contact with a portion of said cylinder and less distant from said passageways, a gas line connected to said inlet passageway, a release valve adapted to operate at a predetermined pressure attached to the outlet passageway of said cylinder, said gas line being adapted to discharge compressed gas into said cylinder at sufficient pressure to move the piston against the bias of the spring compressing the spring until the predetermined pressure of the release valve is exceeded to discharge the gas through the valve from the cylinder into the water.

8. A device for directing fish in water, which comprises a cylinder closed at both ends, means for suspending said cylinder in the water at a predetermined depth, said cylinder having an inlet passageway and an outlet passageway through its walls, compression springs positioned in said cylinder, movable pistons positioned in said cylinder between said springs with one end of each of the pistons abutting to one of said springs, said pistons being at a predetermined point free of the inlet and outlet passageways in the cylinder wall with the end portions of the pistons distant from the springs being in contact with each other, a gas line connected to said inlet passageway for injecting a gas into the cylinder at super-atmospheric pressure sufficient to move the pistons apart against the bias of the springs compressing the springs, and a release valve set to open at a predetermined pressure connected to the outlet passageway of said cylinder to discharge the gas from the cylinder into the water permitting the springs to propel the pistons to impact with each other to generate sound waves.

References Cited by the Examiner

UNITED STATES PATENTS

| | | | |
|---|---|---|---|
| 978,872 | 12/1910 | Freer | 43—17.1 |
| 1,486,083 | 3/1924 | Freer | 43—17.1 |
| 2,860,600 | 11/1958 | Cheney | 119—3 |
| 2,932,110 | 4/1960 | Kilpinen et al. | 43—17.1 |

SAMUEL KOREN, *Primary Examiner.*

W. H. CAMP, *Assistant Examiner.*